(12) United States Patent
Sun et al.

(10) Patent No.: US 9,813,975 B2
(45) Date of Patent: Nov. 7, 2017

(54) MECHANISM FOR DISCOVERY OF SMALL CELLS

(75) Inventors: Pengfei Sun, Beijing (CN); Na Wei, Beijing (CN); Erlin Zeng, Beijing (CN); Chunyan Gao, Beijing (CN); Haiming Wang, Beijing (CN); Wei Bai, Beijing (CN)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 259 days.

(21) Appl. No.: 14/426,284

(22) PCT Filed: Sep. 13, 2012

(86) PCT No.: PCT/CN2012/081347
§ 371 (c)(1),
(2), (4) Date: Mar. 5, 2015

(87) PCT Pub. No.: WO2014/040258
PCT Pub. Date: Mar. 20, 2014

(65) Prior Publication Data
US 2015/0195770 A1 Jul. 9, 2015

(51) Int. Cl.
*H04W 48/12* (2009.01)
*H04J 1/08* (2006.01)
(Continued)

(52) U.S. Cl.
CPC ............... *H04W 48/12* (2013.01); *H04J 1/08* (2013.01); *H04J 11/0079* (2013.01);
(Continued)

(58) Field of Classification Search
None
See application file for complete search history.

(56) References Cited

U.S. PATENT DOCUMENTS

| | | | |
|---|---|---|---|
| 2010/0165882 A1* | 7/2010 | Palanki | H04W 8/005 370/254 |
| 2010/0195566 A1* | 8/2010 | Krishnamurthy | H04L 5/0007 370/328 |

(Continued)

FOREIGN PATENT DOCUMENTS

| | | |
|---|---|---|
| CN | 101427598 | 5/2009 |
| CN | 102440022 | 5/2012 |

OTHER PUBLICATIONS

International Search Report for PCT Application No. PCT/CN2012/081347 dated Jun. 20, 2013.
(Continued)

*Primary Examiner* — Peter Chau
(74) *Attorney, Agent, or Firm* — Foley & Lardner LLP

(57) ABSTRACT

There is proposed a mechanism for controlling and conducting a discovery procedure of small cells or secondary cells located in a macro cell or primary cell. The discovery procedure is based on a discovery signal communicated via PDCH and based on a positioning reference signal (PRS). For configuring the signaling of the discovery signal, frequency domain multiplexing for splitting resources of the PRS in the frequency domain for increasing capacity, and/or usage of reserved communication resources for the signaling of the discovery signal are employed. Assistance information is provided to the UE for supporting the discovery of small cells.

19 Claims, 11 Drawing Sheets

(51) Int. Cl.
*H04J 11/00* (2006.01)
*H04L 5/00* (2006.01)
*H04W 84/04* (2009.01)

(52) U.S. Cl.
CPC .......... *H04L 5/0007* (2013.01); *H04L 5/0048* (2013.01); *H04W 84/042* (2013.01)

(56) References Cited

U.S. PATENT DOCUMENTS

| | | | | |
|---|---|---|---|---|
| 2011/0117926 A1* | 5/2011 | Hwang | ................ | H04W 64/00 |
| | | | | 455/456.1 |
| 2011/0176499 A1* | 7/2011 | Siomina | .................. | G01S 1/042 |
| | | | | 370/329 |
| 2012/0149392 A1 | 6/2012 | Siomina et al. | | |
| 2012/0263145 A1* | 10/2012 | Marinier | ............... | H04W 36/22 |
| | | | | 370/331 |

OTHER PUBLICATIONS

Written Opinion for PCT Application No. PCT/CN2012/081347 dated Jun. 20, 2013.
International Preliminary Report on Patentability for PCT Application No. PCT/CN2012/081347 dated Mar. 17, 2015.

* cited by examiner

MECHANISM FOR DISCOVERY OF SMALL CELLS

RELATED APPLICATIONS

This application is the U.S. National Stage of International Patent Application Number PCT/CN2012/081347 filed Sep. 13, 2012, the entire contents of which are hereby incorporated herein by reference in their entirety for all purposes.

BACKGROUND OF THE INVENTION

Field of the Invention

The present invention relates to a mechanism for conducting a discovery of small cells or secondary cells located in a macro cell or primary cell. In particular, the present invention is directed to apparatuses, methods and computer program products by means of which the discovery of small cells in a macro cell by a user equipment can be improved.

Related Background Art

Prior art which is related to this technical field can e.g. be found in technical specifications according to 3GPP TS 36.211 (e.g. version 10.5.0).

The following meanings for the abbreviations used in this specification apply:
BS: base station
BW: bandwidth
CA: carrier aggregation
CDM: code division multiplex
CPU: central processing unit
CRS common reference signal
DL: downlink
eNB: evolved node B
FDM: frequency division multiplex
ID: identification
LTE: Long Term Evolution
LTE-A: LTE Advanced
OTDOA: observed time difference of arrival
PCFICH: physical control format indicator channel
PCell: primary cell
PCI: physical cell identifier
PDCCH: physical downlink control channel
PDCH: physical discovery channel
PDSCH: physical downlink shared channel
PRACH: physical random access channel
PRB: physical resource block
PRS: position reference signal
PSS: primary synchronization signal
RRH: radio remote head
RS: reference signal
RSTD: reference signal time difference
SCell: secondary cell
SINR: signal to interference plus noise ration
SSS: secondary synchronization signal
UE: user equipment
UL: uplink In the last years, an increasing extension of communication networks, e.g. of wire based communication networks, such as the Integrated Services Digital Network (ISDN), DSL, or wireless communication networks, such as the cdma2000 (code division multiple access) system, cellular 3rd generation (3G) communication networks like the Universal Mobile Telecommunications System (UMTS), enhanced communication networks based e.g. on LTE, cellular 2nd generation (2G) communication networks like the Global System for Mobile communications (GSM), the General Packet Radio System (GPRS), the Enhanced Data Rates for Global Evolutions (EDGE), or other wireless communication system, such as the Wireless Local Area Network (WLAN), Bluetooth or Worldwide Interoperability for Microwave Access (WiMAX), took place all over the world. Various organizations, such as the 3rd Generation Partnership Project (3GPP), Telecoms & Internet converged Services & Protocols for Advanced Networks (TISPAN), the International Telecommunication Union (ITU), 3rd Generation Partnership Project 2 (3GPP2), Internet Engineering Task Force (IETF), the IEEE (Institute of Electrical and Electronics Engineers), the WiMAX Forum and the like are working on standards for telecommunication network and access environments.

For improving the performance of new communication networks, such as that of LTE or LTE-A based networks, carrier aggregation (CA) is employed so as to support wider transmission bandwidths. CA in LTE-A extends the maximum bandwidth in the UL or DL directions by aggregating multiple carriers within a frequency band (intra-band CA) or across frequency bands (inter-band CA).

In order to support all CA deployment scenarios, it is contemplated to design an additional carrier type. Such a new carrier type does not need to be backward compatible and allows thus a certain flexibility in its configuration. In other words, as such a new type of carrier does not necessarily be usable by legacy UE, some enhancement may be supported on it, for example a reduction of the density or even a re-design of reference signals which may allow to save overhead, and to consider some optimization to suit to specific application scenarios.

A further item of new communication network system is the implementation of heterogeneous networks consisting of e.g. a "normal" communication cell (referred to as macro cell) and plural small cells which allows a better coverage and possibly outsourcing options from a communication to the macro cell to a small cell (which may be connected to the network e.g. by a backhaul network offering higher capacity), or the like. In the following, it is assumed that a macro cell is used as a primary cell (PCell) for a UE communication, and the small cells are used as secondary cells (SCells) for the UE communication.

In order to enhance the usage of heterogeneous networks, i.e. to achieve heterogeneous network mobility enhancements for e.g. LTE based networks, it is necessary to provide suitable mechanisms for small cell discovery/identification. In this context, it is considered to use also the new carrier type for a quick cell identification of small cells, for example in a scenario where the small cells are constituted by using RRHs.

An example for a new physical channel is the so-called Physical Discovery Channel (PDCH). The PDCH is configured such that is has a relative long periodicity, e.g. a few seconds assuming relaxed measurement requirements for energy saving and low mobility and sufficient time/frequency radio resource density for one-shot PDCH reception by the UE for efficient UE battery consumption (e.g. full use of a few subframes).

However, due to the long periodicity of PDCH, it may introduce larger cell access/detection delay. An attempt to solve this by, for example, a simple reduction of the periodicity may not be feasible as the other advantages of PDCH, such as low power consumption, would be affected thereby.

SUMMARY OF THE INVENTION

Examples of embodiments of the invention provide an apparatus, method and computer program product by means of which a discovery/identification of small cells or secondary cells located in a macro cell or primary cell is improved. In particular, examples of embodiments of the invention provide apparatuses, methods and computer program products providing an improved discovery mechanism for small cells in a macro cell by a user equipment, for example when using a PDCH for signaling a discovery signal for the small cells.

This is achieved by the measures defined in the attached claims.

According to an example of an embodiment of the proposed solution, there is provided, for example, a method comprising controlling a discovery procedure for discovering at least one secondary cell located in a communication area of a primary cell, the discovery procedure using a discovery signal communicated via a physical discovery channel, configuring a signaling of the discovery signal, wherein the discovery signal is based on a positioning reference signal, and applying, when configuring the signaling of the discovery signal, at least one of frequency domain multiplexing for splitting resources of the positioning reference signal in the frequency domain, and using reserved communication resources for the signaling of the discovery signal, the reserved communication resources being otherwise reserved for specific control channels.

Furthermore, according to an example of an embodiment of the proposed solution, there is provided, for example, an apparatus comprising at least one processor; and at least one memory including computer program code; wherein the at least one memory and the computer program code are configured, with the at least one processor, to cause the apparatus at least to perform a discovery procedure control function configured to control a discovery procedure for discovering at least one secondary cell located in a communication area of a primary cell, the discovery procedure using a discovery signal communicated via a physical discovery channel, and a discovery signaling configuration function arranged to configure a signaling of the discovery signal, and to apply in the configuration of the signaling of the discovery signal, at least one of frequency domain multiplexing for splitting resources of the positioning reference signal in the frequency domain, and using reserved communication resources for the signaling of the discovery signal, the reserved communication resources being otherwise reserved for specific control channels.

In addition, according to a further example of an embodiment of the proposed solution, there is provided, for example, a method comprising executing a discovery procedure for discovering at least one secondary cell located in a communication area of a primary cell, the discovery procedure using a discovery signal based on a positioning reference signal and communicated via a physical discovery channel, wherein the discovery procedure is based on a configuration of the signaling of the discovery signal, the configuration applying at least one of frequency domain multiplexing for splitting resources of the positioning reference signal in the frequency domain, and using reserved communication resources for the signaling of the discovery signal, the reserved communication resources being otherwise reserved for specific control channels.

Furthermore, according to the further example of an embodiment of the proposed solution, there is provided, for example, an apparatus comprising at feast one processor; and at least one memory including computer program code; wherein the at least one memory and the computer program code are configured, with the at least one processor, to cause the apparatus at least to perform a discovery procedure executing function arranged to execute a discovery procedure for discovering at least one secondary cell located in a communication area of a primary cell, the discovery procedure using a discovery signal based on a positioning reference signal and communicated via a physical discovery channel, wherein the discovery procedure is based on a configuration of the signaling of the discovery signal, the configuration applying at least one of frequency domain multiplexing for splitting resources of the positioning reference signal in the frequency domain, and using reserved communication resources for the signaling of the discovery signal, the reserved communication resources being otherwise reserved for specific control channels.

Moreover, according to a still further example of an embodiment of the proposed solution, there is provided, for example, a method comprising causing transmitting of a discovery signal usable for discovering a secondary cell located in a communication area of a primary cell, wherein the discovery signal is based on a positioning reference signal and communicated via a physical discovery channel, and setting a signaling of the discovery signal on the basis of a configuration of the signaling of the discovery signal, the configuration applying at least one of frequency domain multiplexing for splitting resources of the positioning reference signal in the frequency domain, and using reserved communication resources for the signaling of the discovery signal, the reserved communication resources being otherwise reserved for specific control channels.

Furthermore, according to the still further example of an embodiment of the proposed solution, there is provided, for example, an apparatus comprising at least one processor; and at least one memory including computer program code; wherein the at least one memory and the computer program code are configured, with the at least one processor, to cause the apparatus at least to perform a discovery signal transmitting function arranged to cause transmitting of a discovery signal usable for discovering a secondary cell located in a communication area of a primary cell, wherein the discovery signal is based on a positioning reference signal and communicated via a physical discovery channel, and a discovery signaling setting function arranged to set a signaling of the discovery signal on the basis of a configuration of the signaling of the discovery signal, the configuration applying at least one of frequency domain multiplexing for splitting resources of the positioning reference signal in the frequency domain, and using reserved communication resources for the signaling of the discovery signal, the reserved communication resources being otherwise reserved for specific control channels.

In addition, according to examples of the proposed solution, there is provided, for example, a computer program product for a computer, comprising software code portions for performing the steps of the above defined methods, when said product is run on the computer. The computer program product may comprise a computer-readable medium on which said software code portions are stored. Furthermore, the computer program product may be directly loadable into the internal memory of the computer and/or transmittable via a network by means of at least one of upload, download and push procedures.

By virtue of the proposed solutions, it is possible to provide an improved discovery mechanism for discovering small cells or secondary cells located in a macro cell or primary cell. In particular, according to some examples of embodiments, an enhanced PRS based discovery scheme for discovering small cells is provided which require minimum change on current PRS design so that a maximum reuse is achieved. In addition, according to some examples of embodiments, enhanced capacity and deployment flexibility is provided. That is, according to some examples of embodiments, a discovery procedure is provided which uses existing PRS channel configuration approaches while only a small change on legacy PRS design is required. Furthermore, according to some examples of embodiments, enhanced capacity is provided which enables to provide more orthogonal resources to support larger number of RRHs. Moreover, according to some examples of embodiments, an increased flexibility to meet various RRH deployment scenarios, for example, is provided.

The above and still further objects, features and advantages of the invention will become more apparent upon referring to the description and the accompanying drawings.

DESCRIPTION OF PREFERRED EMBODIMENTS

Figure 1:
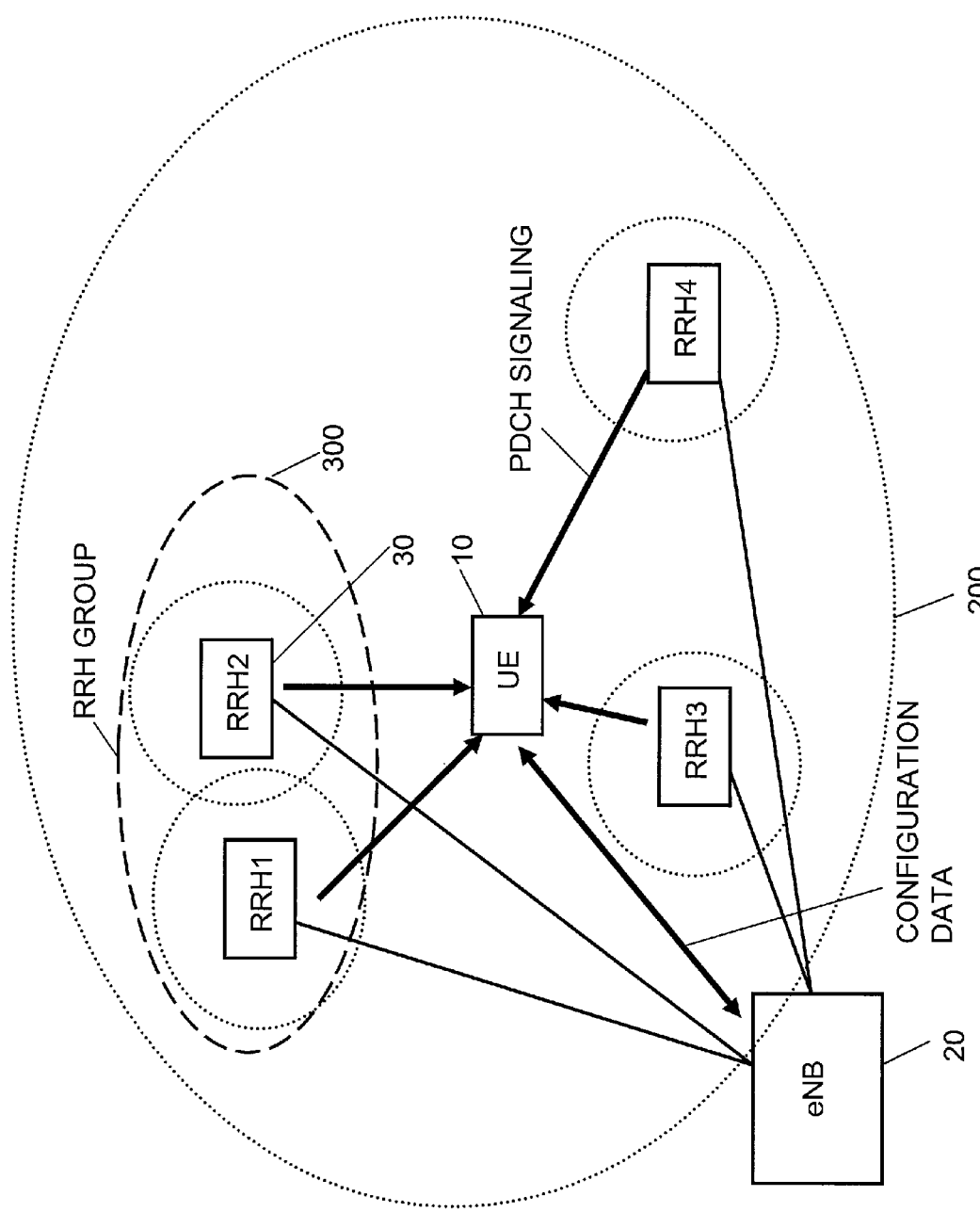
FIG. 1 shows a diagram illustrating a communication network structure in which some examples of embodiments of the invention are applicable.

In the following, some examples and some embodiments of the present invention are described with reference to the drawings. For illustrating the present invention, some examples and embodiments will be described in connection with a cellular communication network based on a 3GPP LTE-A system wherein a heterogeneous network configuration comprising a macro cell controlled by a communication network control element, such as an eNB, and plural small cells located in the macro cell and constituted by a subcell transceiver element such as an RRH is employed (the macro cell is referred to also as primary cell or Pcell while the small cells are referred to as secondary cells or Scells). However, it is to be noted that the present invention is not limited to an application using such types of communication systems, but is also applicable in other types of communication systems and the like as long as a heterogeneous network configuration with a Pcell and one or more Scells is present.

A basic system architecture of a communication network where some examples of embodiments of the invention are applicable may comprise a commonly known architecture of one or more communication systems comprising a wired or wireless access network subsystem and a core network. Such an architecture may comprise one or more access network control elements, radio access network elements, access service network gateways or base transceiver stations, such as a base station or eNB, which control a coverage area also referred to as a macro cell and with which a communication element or terminal device such as a UE or another device having a similar function, such as a modem chipset, a chip, a module etc., which can also be part of a UE or attached as a separate element to a UE, or the like, is capable to communicate via one or more channels for transmitting several types of data. Furthermore, core network elements such as gateway network elements, policy and charging control network elements, mobility management entities and the like may be comprised. In addition to the macro cell access network element, plural small cells forming a secondary coverage area (e.g. in addition to the macro cell coverage or in sites where the macro cell coverage is weak or non-existent) are present, which are constituted by using RRH, relay nodes or the like.

The general functions and interconnections of the described elements, which also depend on the actual network type, are known to those skilled in the art and described in corresponding specifications, so that a detailed description thereof is omitted herein. However, it is to be noted that several additional network elements and signaling links may be employed for a communication to or from a communication element like a UE or a communication network control element like an eNB etc., besides those described in detail herein below.

Furthermore, the described network elements, such as communication elements like UEs, communication network control elements like base stations, access nodes, eNBs, RRHs and the like, as well as corresponding functions as described herein may be implemented by software, e.g. by a computer program product for a computer, and/or by hardware. In any case, for executing their respective functions and/or algorithms, correspondingly used devices, nodes or network elements may comprise several means and components (not shown) which are required for control, processing and communication/signaling functionality. Such means may comprise, for example, one or more processor units including one or more processing portions for executing instructions, programs and for processing data, memory means for storing instructions, programs and data, for serving as a work area of the processor or processing portion and the like (e.g. ROM, RAM, EEPROM, and the like), input means for inputting data and instructions by software (e.g. floppy disc, CD-ROM, EEPROM, and the like), user interface means for providing monitor and manipulation possibilities to a user (e.g. a screen, a keyboard and the like), interface means for establishing links and/or connections under the control of the processor unit or portion (e.g. wired and wireless interface means, an antenna, etc.) and the like. It is to be noted that in the present specification processing portions should not be only considered to represent physical portions of one or more processors, but may also be considered as a logical division of the referred processing tasks performed by one or more processors.

With regard to FIG. 1, a diagram illustrating a general configuration of a communication network is shown where some examples of embodiments of the invention are applicable. It is to be noted that the structure indicated in FIG. 1 shows only those devices, network elements and parts which are useful for understanding principles underlying some examples of embodiments of the invention. As also known by those skilled in the art there may be several other network elements or devices involved in a connection between the communication element (UE) and the network which are omitted here for the sake of simplicity.

In FIG. 1, reference sign 10 denotes a communication element or terminal device such as a UE or the like which is capable of communicating with the communication network.

Reference sign 20 denotes a communication network control element such as a base station or eNB controlling a communication area or macro cell 200 (indicated by a dashed line). It is to be noted that there may be several cells or sectors in the communication network which are controlled, for example, by the communication network control element 20. The UE 10 communicates with the eNB 20 via one or more communication paths.

In addition, for providing a heterogeneous network, there are provided several small cells 300 in the macro cell 200. These small cells 300 are constituted, for example, by a respective transceiver network element 30 like an RRH. In the example shown in FIG. 1, four RRHs (RRH1 to RRH4) are provided forming correspondingly four small cells. The RRHs are connected to the macro cell communication network control element by means of corresponding links (backhaul links) as shown in FIG. 1.

According to some examples of embodiments of the invention, small cells 300 located in the macro cell 200 can be suitably grouped. For example, in the deployment scenario shown in FIG. 1, the cells constituted by the RRHs 30 (RRH1 and RRH2) are included into a RRH group. The division of the RRHs in a respective group is based, for example, on the position/location of the respective RRH/ Scell or on coverage properties like overlapping coverage areas etc. That is, according to some examples of embodiments of the invention, grouping of the RRHs is based on their geographical location which is assumed to be known by the network. By means of this, according to some examples of embodiments of the invention, RRHs being close to each other are assigned to the same group.

It is to be noted that according to some examples of embodiments of the invention, the geographical location of the RRHs in the network can be determined by GPS signals when the RRHs are equipped with a GPS modem technology, by Precision Time Protocol (PTP) signaling (as specified in IEEE 1588, for example) wherein it is assumed that the RRHs have a fixed backhaul connection to the eNB 20, for example, or in another manner. Furthermore, according to some examples of embodiments of the invention, the grouping of the RRHs in the respective groups can be executed e.g. in a network setup phase on basis of a network management procedure or by operator specification, or by the communication network control element of the macro cell.

As shown in FIG. 1, a discovery mechanism is assumed where the RRHs 30 send (e.g. broadcast) a discovery signal via a specified channel (e.g. PDCH) so as to enable a UE to detect the presence of the small cell. This is indicated in FIG. 1 by corresponding arrows from the RRHs 30.

As described above, in order to support the discovery of e.g. (small) cells in communication networks, such as those being based on the release 11 of 3GPP LTE-A or later, Physical Discovery Channel (PDCH) is employable. Basically, for detecting cells and for conducting synchronization with the cell thus detected by using PDCH signaling, several approaches are conceivable.

For example, according to a comparative example, PSS/ SSS channels which are used for initial synchronization and new cell identification in current networks according to LTE standards could be employed. The PSS/SSS approach could be supplemented by reusing a positioning reference signal (PRS) for the PDCH. However, due to the fixed mapping pattern with six sub-carrier separations, a common PRS may have certain drawbacks.

When using current PRS scheme for a discovery procedure of small cells in a heterogeneous network with plural RRHs, according to a comparative example useful for understanding the invention, the following is to be considered.

Figure 2:
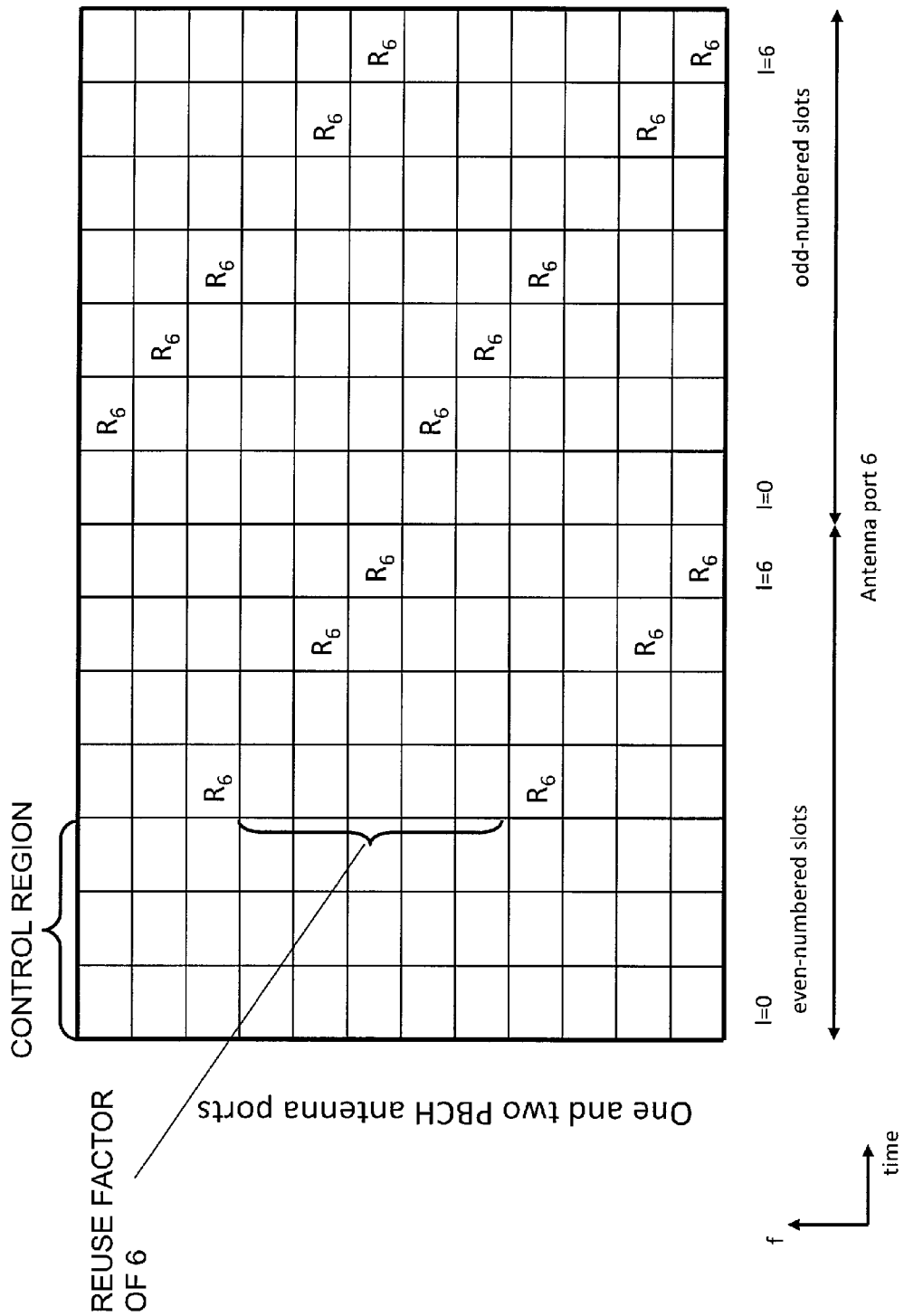
FIG. 2 shows a diagram illustrating a resource block indicating an arrangement of PRS according to a comparative example useful for understanding some embodiments of the invention.

FIG. 2 shows a diagram illustrating a resource block indicating an arrangement of PRS according to the comparative example useful for understanding some embodiments of the invention.

Specifically, FIG. 2 shows the PRS pattern (indicated by "$R_6$" in a respective resource element) in a cell with one or two cell specific transmit antenna ports (antenna port 6 is used for PRS transmission, for example). The resource block comprises resource elements distributed in the frequency and time domain (code domain is not shown). As indicated in FIG. 2, a specific part (also referred to as control region) is reserved for certain control channels, such as PDCCH etc., where PRS is not set. Furthermore, the legacy PRS pattern provides a reuse factor of 6.

As PRS is originally introduced to do OTDOA based positioning, it is deemed to be also suitable for synchronization and cell discovery. For example, PRS provides a long periodicity (up to 1280 subframes (1.28 s) periodicity), an increased resource density (up to 6 consecutive DL subframes in one positioning occasion), dedicated resource (orthogonal resource with muted PDSCH and PDCCH, CRS puncture), a sufficient cell ID capacity (one-to-one mapping of the PRS sequence to the PCI (504 cell ID), provision of assistance data passed from a position server to inform UEs about necessary information that may be useful to improve the positioning performance (for example, an assistance information indicating an expected RSTD measurement is useful for reducing the searching window performed by the UE).

These features are also useful for improving the discovery performance if PRS is used e.g. for RRH discovery. For example, the long periodicity reduces the UE's detection effort and the muted PDSCH as well as punctured PDCCH and CRS ensure the received SINR. The eNB assistance data can serve as a coarse synchronization to accelerate detection.

However, when simply implementing the legacy PRS scheme (as shown in FIG. 2) for discovery procedure purposes of RRHs, there are certain issues to be considered.

For example, as indicated above, PRS is designed for OTDOA based positioning, which requires very high performance of timing synchronization. However, the small cell discovery requires much lower timing synchronization performance. The more critical issue is caused by the possibly large number of deployed small cells.

That is, one issue is the rather limited capacity of PRS. As indicated in FIG. 2, the legacy PRS pattern only provides a reuse factor of 6 in the frequency domain. This reuse factor according to the comparative example, even though being sufficient for providing a good resource orthogonality for OTDOA (since only 3 eNBs at minimum are sufficient to perform OTDOA positioning), it has been found out that RRH detection requires more capacity to meet the requirement caused by a possible dense deployment of RRHs (i.e. a large number of available RRHs). Also the configurability of legacy RRH to flexibly utilize the physical resource is not sufficient for RRH discovery purposes. In addition, certain aspects of legacy PRS, such as the PDCCH and CRS puncture, are not necessary for RRH detection, as the new carrier type may not be backward compatible.

According to some examples of embodiments of the invention, in order to provide an improved discovery scheme based on PRS and using e.g. PDCH in an identification/discovery procedure of e.g. small cells located in a macro cell, when e.g. large number of deployed small cells is present, specific measures are applied in the configuration of a signaling of a discovery signal based on PRS. According to some examples of embodiments of the invention, these measures comprise one or more of the following: FDM based PRS capacity enhancement, intelligent utilization of legacy control region in resource block, and enhanced assistance data transfer. In addition, according to some examples of embodiments of the invention, grouping of RRHs is utilized to support discovery of suitable small cells.

Specifically, according to an example of embodiments of the invention, for configuring the signaling of a discovery signal using PRS, frequency domain multiplexing is applied. By means of using frequency domain multiplexing, it is possible to increase the capacity, for example.

According to an example of embodiments of the invention, as one frequency domain multiplexing scheme, a subband based PRS multiplexing is applied. The PRS resources are split in the frequency domain to provide more orthogonal resources. Specifically, in the subband based PRS resource multiplexing, in the configured bandwidth, the PRBs are divided into a serial of blocks of consecutive PRBs, each of which forms one orthogonal resource. In each orthogonal resource, the PRS pattern can be kept the same. As a result, the frequency density of the PRS is reduced, for example.

It is to be noted that in case of using a subband based PRS resource multiplexing, according to some examples of embodiments of the invention, additional operations such as time or cell dependent offset are also possible.

Figure 3:
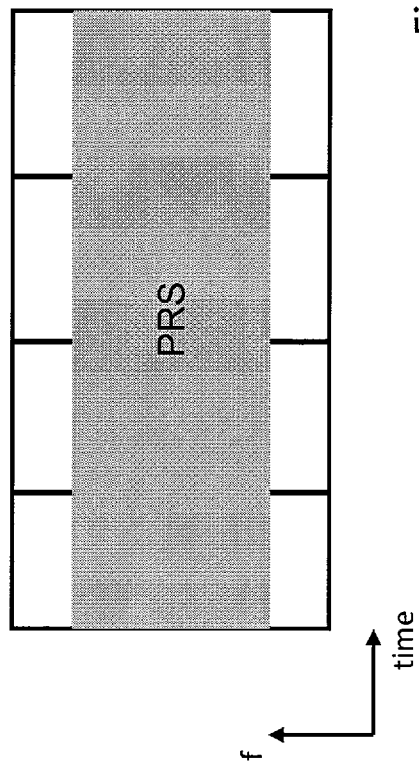
FIG. 3 shows a diagram illustrating a radio frame structure indicating a bandwidth usage for PRS transmission according to a comparative example useful for understanding some embodiments of the invention.

For further explaining the concept of the subband based PRS multiplexing, first in FIG. 3, a diagram is shown which illustrates a radio frame structure in case of a conventional PRS pattern. As indicated in FIG. 3, the legacy PRS pattern spans the whole configured bandwidth wherein 6 orthogonal t/f resources are provided (see also FIG. 2).

Figure 4:
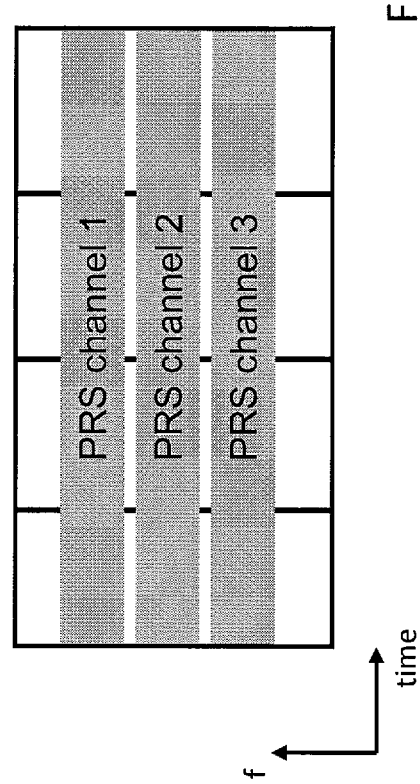
FIG. 4 shows a diagram illustrating a radio frame structure indicating a bandwidth usage for PRS transmission according to an example of an embodiment of the invention.

On the other hand, according to FIG. 4, which shows a diagram illustrating a radio frame structure indicating a bandwidth usage for PRS transmission according to an example of an embodiment of the invention, i.e. in case of the subband based PRS multiplexing, the bandwidth is split into three parallel channels (PRS channel 1 to 3, for example, while splitting in less than or more than 3 channels is also possible). Each of these PRS channels represents one orthogonal resource. According to some examples of embodiments of the invention, within each channel, the PRS pattern is kept the same. Furthermore, according to some examples of embodiments of the invention, the PRS pattern is the same as that of a legacy PRS arrangement (see e.g. FIG. 2). For example, as a result of the subband based PRS multiplexing, the capacity is increased (for example by a factor of 3 in the example shown in FIG. 4).

According to another example of embodiments of the invention, as another frequency domain multiplexing scheme, e.g. for improving the PRS capacity, a distributed PRS resource multiplexing scheme is applied.

Figure 5:
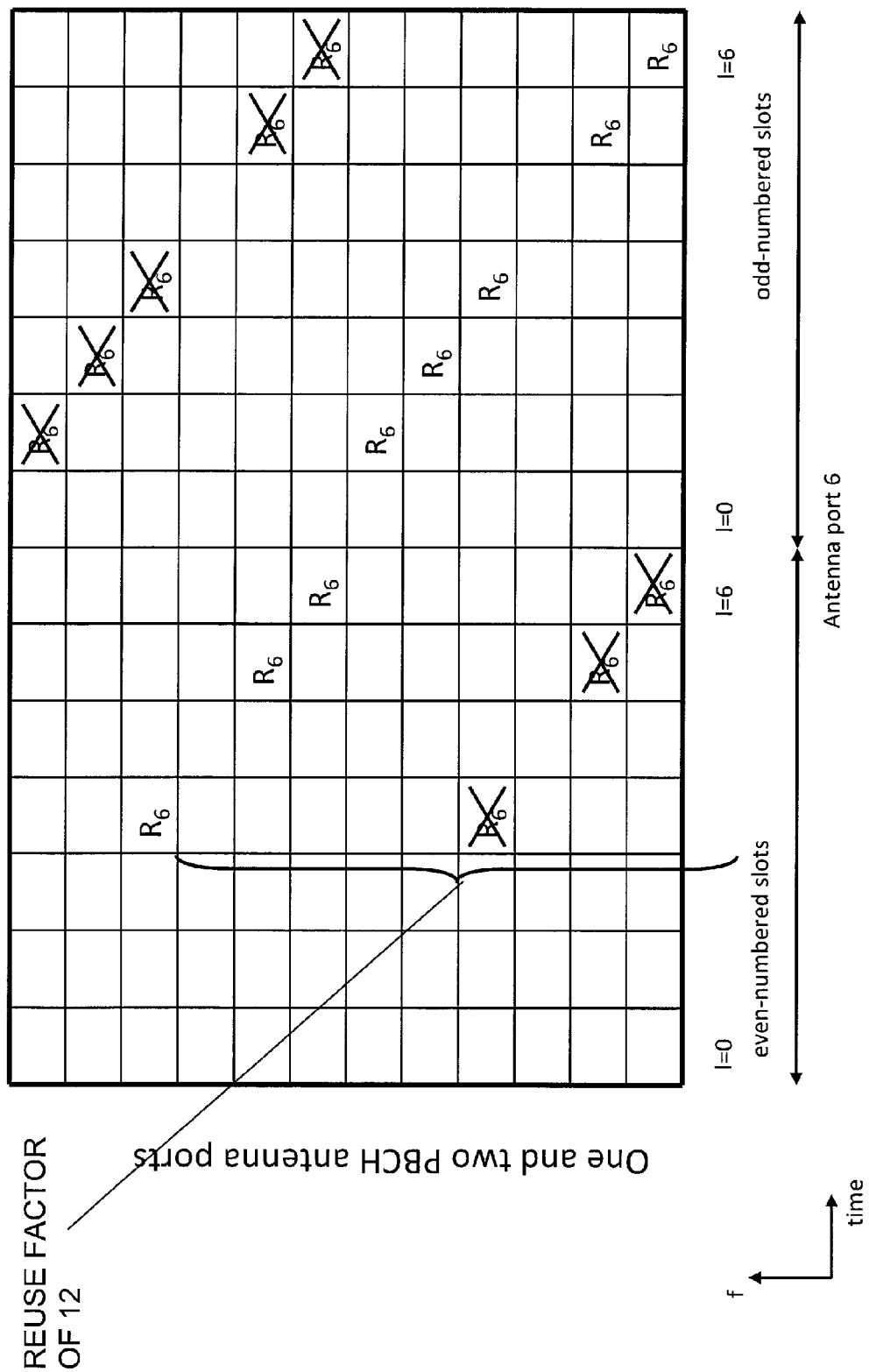
FIG. 5 shows a diagram illustrating a resource block indicating an arrangement of PRS according an example of an embodiment of the invention.

FIG. 5 shows a diagram illustrating a resource block indicating an arrangement of PRS according an example of an embodiment of the invention where a distributed PRS resource multiplexing scheme is applied. The diagram according to FIG. 5 is based on the diagram according to FIG. 2 illustrating the legacy PRS pattern. When comparing FIG. 5 and FIG. 2, it can be seen that according to the present example of embodiments of the invention, in the distributed PRS resource multiplexing scheme, a part of resources in resource blocks, for example, according to examples of embodiments of the invention, in each of the resource blocks, which were originally allocated to PRS signaling, i.e. several of the $R_6$ comprising resource elements are released (indicated by crossed out resource element contents), i.e. not used for $R_6$ signaling purposes anymore (at least temporarily). As a result, the former reuse factor of 6 can be increased or extended so that more configurations of larger value are possible. Thus, it is possible to support more orthogonal resources. The frequency density of the PRS is therefore reduced in this case.

That is, the distributed PRS multiplexing scheme does not reduce the configured bandwidth for each PRS. Instead, the reuse factor is extended to a larger value, for example 12 as shown in FIG. 5. In this way, the capacity for orthogonal resource is e.g. doubled.

It is to be noted that the frequency domain multiplexing schemes according to FIGS. 4 and 5 are combined in further examples of embodiments of the invention. That is, by a combination of the subband based and the distributed PRS multiplexing schemes it is possible to further increase the capacity.

Furthermore, it is to be noted that the specific PRS configuration is determined, according to some examples of embodiments of the invention, by deployment requirements and eNB coordination. The UE is informed about the configurations via higher layer signaling, for example.

Moreover, according to another example of embodiments of the invention, for configuring the signaling of a discovery signal using PRS, an intelligent utilization of reserved resources, such as of a control region is applied. By means of using such reserved resources, it is possible to further increase the capacity.

Figure 6:
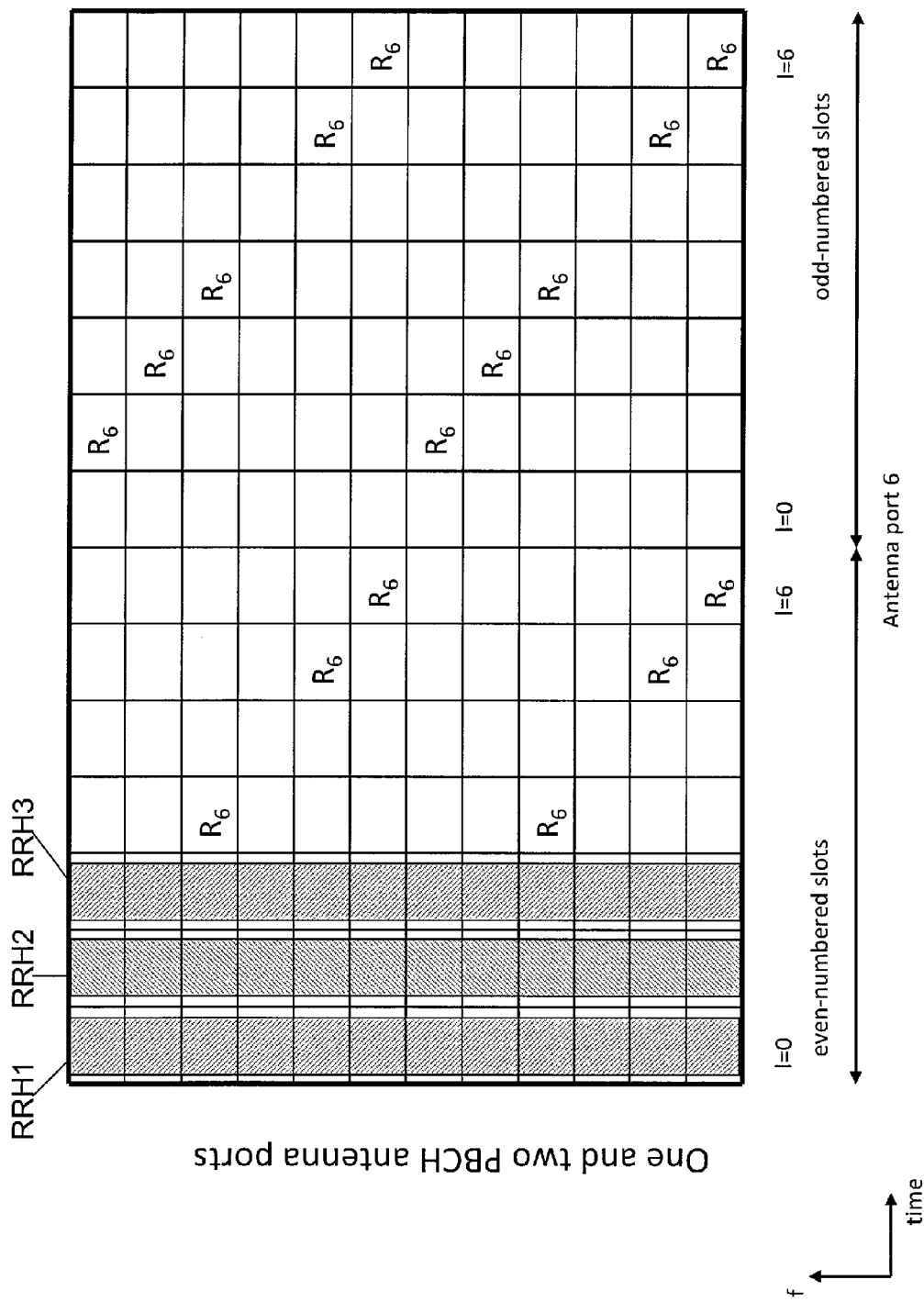
FIG. 6 shows a diagram illustrating a resource block indicating an arrangement of PRS and control region usage according a further example of an embodiment of the invention.

For explaining the usage of reserved resources such as a control region (see FIG. 2), reference is made to FIG. 6 which shows a diagram illustrating a resource block indicating an arrangement of PRS and control region usage according the further example of an embodiment of the invention.

As can be seen in FIG. 2, in a comparative example being based on a legacy PRS arrangement, in the control region, PRS are left blank. The reason is to avoid collision with control channels, such as PDCCH, PCFICH etc. However, for a discovery procedure of small cells etc., such a punctured region like the control region is found out to be unnecessary. In RRH discovery the colliding control channels are absent. Therefore, according to the present example of an embodiment of the invention, resource elements in this region are smartly utilized to either enhance the discovery performance or to increase the PRS capacity.

For example, according to a further example of embodiments of the invention, the PRS pattern is kept unchanged and the resources for PRS are extended to the resource elements of the (former) control region. Thus, discovery performance can be enhanced.

According to a still further example of embodiments of the invention, the PRS pattern and the used resources are kept unchanged (i.e. as shown in FIG. 2). On the other hand, the control region is filled with other orthogonal sequences (as indicated in FIG. 6, three sequences for RRH1 to RRH3, for example, are included. These additional sequences in the control region can be orthogonal or semi-orthogonal in time, frequency or code domain. Furthermore, the additional sequences in the control region are generated separately from PRS. Moreover, the additional sequences in the control region are associated to one or multiple orthogonal resources in the PRS region ($R_6$). In this way, it is possible, for example, to determine a cell ID of corresponding Scell of RRH1 to RRH3, for example) by a combination of the respective sequence in the control region and PRS. In this case, the capacity is increased.

Referring to FIG. 6, an example is shown where the control region is utilized to increase the PRS capacity by including three sequences which are multiplexed in the time domain. Therefore, three RRHs (RRH1 to RRH3) sharing the same resource in the PRS region can be allocated to these orthogonal resources. During the execution of the discovery procedure, the UE 10 checks the control region to better distinguish the sequences transmitted in the PRS region.

It is to be noted that according to further examples of embodiments the schemes according to FIGS. 4, 5 and 6 are combined. In this case, the capacity is approximately increased by 18 times, for example.

In addition to the above described examples for configuring the signaling of a discovery signal using PRS, in a discovery procedure according to a further example of embodiments of the invention, assistance data based on assistance data of PRS are used e.g. for improving the discovery procedure performance. Corresponding assistance data as defined in legacy PRS schemes, such as expected RSTD, expected RSTD uncertainty, are reused by the present RRH discovery procedure. Enhanced assistance information associated to the PRS configuration for use in the discovery procedure are signaled, for example, to the UE 10 via higher layer signaling.

According to some examples of embodiments of the invention, assistance information usable for the discovery procedure comprise e.g. one or more of frequency domain starting point of each RRH when subband based PRS multiplexing scheme is used control region configuration, e.g. whether the control region is used for PRS extension or new sequences.

According to some examples of embodiments of the invention, as a further assistance information usable for the discovery procedure, a grouping information is used. As indicated above, e.g. based on the geographical distribution or the coverage area of the RRHs, at least some of the RRHs are grouped together (in the network shown in FIG. 1, RRH1 and RRH2 are assumed to be grouped together). That is, due to the possibly dense deployment of small cells, the coverage areas of several RRHs may overlap to each other. Thus it is very likely that the UE detects these RRHs at the same time. Hence, according to some examples of embodiments of the invention, such RRHs (e.g. RRH1 and RRH2 in FIG. 1) are virtually grouped. The Pcell, i.e. the eNB 20, transmits (broadcasts) a corresponding grouping information, so as to enable the UE to better refine its discovery results.

In other words, in some examples of embodiments, grouping information is sent to the UE 10 in order to assist the UE to increase the discovery accuracy. For example, the RRH grouping information tells the UE 10 that discovery signals of RRHs of the RRH group comprising of RRHs 1 and 2 is likely to be detected (or not) at the same time because they are close to each other.

According to some examples of embodiments of the invention, the UE 10 uses the combined sequence of these RRHs' signal locally to detect the group first and then find out which RRH within the group has a better link. That is, according to some examples of embodiments of the invention, when a group of RRHs is first detected based on same PRS transmissions concurrently done by all the RRHs in the group, the UE 10 can then use sequences mapped to different symbols in the control region (see e.g. FIG. 6) to detect the best RRH within the group (e.g. the RRH offering the best link).

According to some examples of embodiments of the invention, a UE (such as UE 10) learns the configuration of the signaling of discovery signals before detecting for a discovery signal from the Scells. This is achieved by transmitting a configuration indication related to signaling of the discovery signal in the Pcell. For example, the configuration indication is provided by the assistance data. The transmission of the configuration indication is shown in FIG. 1 by means of an arrow from the eNB 20. For transmitting the configuration indication from the eNB 20 to the UE 10, different mechanisms are possible. For example, according to some example embodiments of the invention, a higher layer signaling is used by the eNB 20. Furthermore, in some example embodiments of the invention, the eNB 20 broadcasts the configuration indication in the macro cell so as to assist UEs located therein to perform Scell discovery. According to further examples of embodiments of the invention, the configuration indication is sent in a dedicated manner to a UE having an established connection to the eNB.

After successfully detecting an Scell, e.g. on the basis of the configuration indication, measurements can be executed based e.g. on reference signal, such as CRS, or another RS signal so as to activate a connection of the UE to a suitable RRH.

Figure 7:
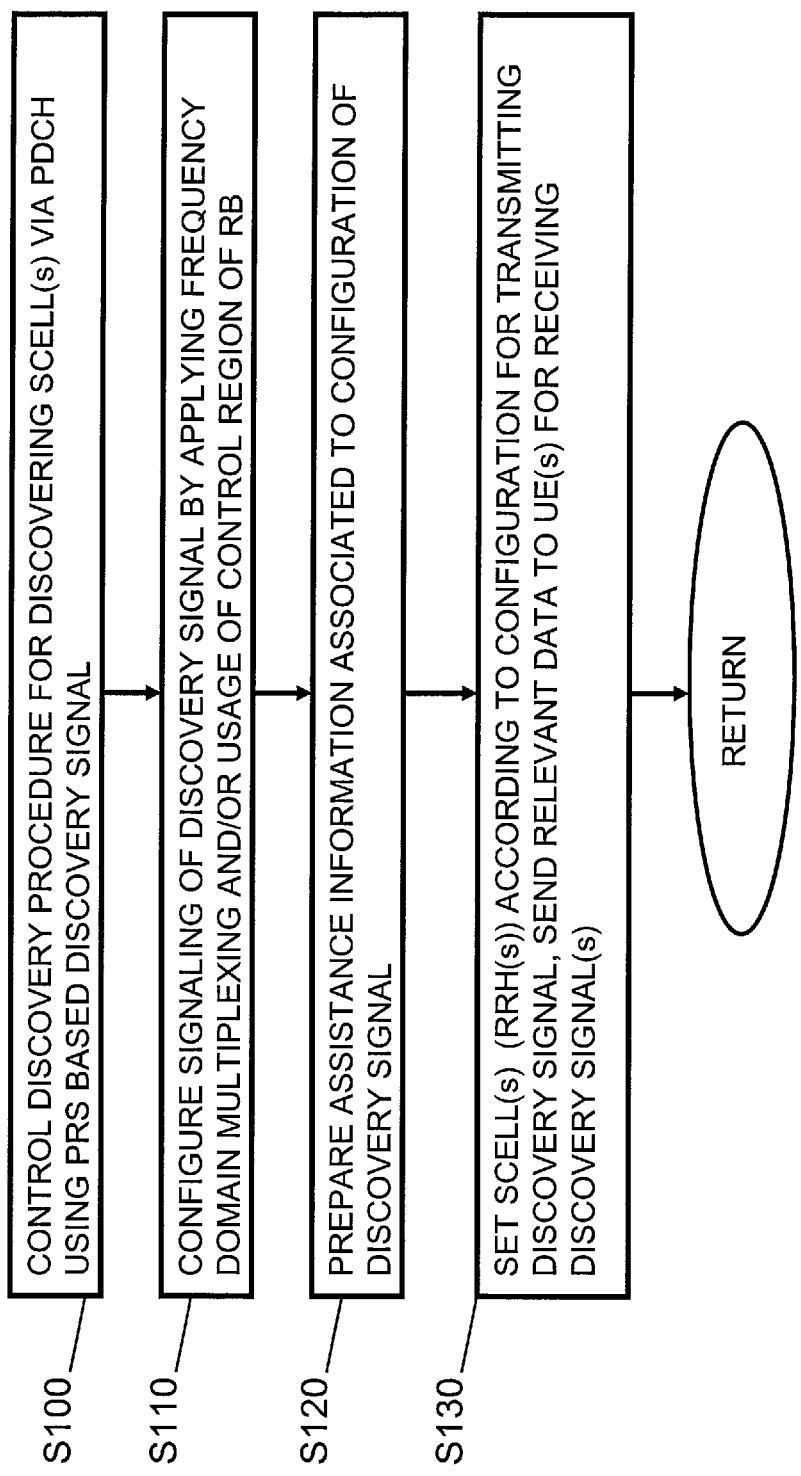
FIG. 7 shows a flowchart illustrating a discovery procedure conducted by a communication network control element according to an example of an embodiment of the invention.

FIG. 7 shows a flowchart illustrating a processing for conducting a discovery procedure of small cells in a communication network as shown e.g. in FIG. 1 according to some examples of embodiments of the invention. Specifically, FIG. 7 shows a processing for controlling a corresponding discovery procedure on the network side. The method in FIG. 7 is executed, according to some example embodiments of the invention, in a communication network control element like the eNB 20.

In step S100, control of a discovery procedure for discovering at least one secondary cell (Scell) located in a communication area of a primary cell (Pcell) is initiated. According to some example embodiments of the invention, the discovery procedure uses a discovery signal based on PRS, as described above, wherein the discovery signal is communicated via a special channel, such as a PDCH.

In step S110, signaling of the discovery signal, e.g. on the PDCH, is configured. For configuring the signaling of the discovery signal, according to some example embodiments of the invention, one or more of the following schemes are applied.

Based on the considerations made in connection with e.g. FIG. 4 and FIG. 5, a frequency domain multiplexing is applied for splitting PRS resources in the frequency domain.

That is, according to an example of embodiments of the invention, frequency domain multiplexing is conducted by multiplexing PRS resources on the basis of subbands of a PRS allocated bandwidth in a radio frame, wherein resource blocks are divided into serials of blocks of consecutive resource blocks forming a respective orthogonal resource. In this case, according to some example embodiments of the invention, the pattern of a legacy PRS arrangement can be kept unchanged and the same in each orthogonal sequence, wherein also a time or cell dependent offset can be considered. By means of this scheme, frequency density of PRS is reduced and hence capacity is enhanced.

Furthermore, according to some example embodiments of the invention, frequency domain multiplexing is conducted by a distributed multiplexing of PRS resources, wherein a part of the resources within a resource block (e.g. in each resource block) originally allocated to the PRS is released. By means of this scheme, a reuse factor can be increased, frequency density of PRS is reduced and hence capacity is enhanced.

As another scheme for configuring the signaling of the discovery signal, according to some example embodiments of the invention, and based on the considerations made in connection with e.g. FIG. 6, reserved communication resources are used for the signaling of the discovery signal. That is, reserved communication resources being otherwise reserved for specific control channels such as PDCCH etc. which are not used in the case of small cells employing RRHs or the like, are utilized in an intelligent manner. According to some example embodiments of the invention, the reserved communication resources of e.g. a control region of a resource block are used for the signaling of the discovery signal by at least one of using resource elements of the reserved communication resources for the discovery signal based on the PRS, wherein a pattern of arrangement of the PRS is kept unchanged, and by using resource elements of the reserved communication resources for additional sequences being associated to resources of the PRS. According to some example embodiments of the invention, these additional sequences are orthogonal or semi-orthogonal in time, frequency or code domain, generated separately from the PRS, and associated to one or multiple orthogonal resources related to the PRS for providing information related to an identity of a secondary cell (e.g. in case of a grouping of RRHs).

In step S120, assistance information associated to the configuration of the signaling of the discovery signal is prepared. The assistance information is signaled, according to some example embodiments of the invention, via a higher layer signaling to the UE 10. The assistance information indicates, for example, at least one of a frequency domain starting point of a secondary cell in case the configuration uses frequency domain multiplexing with subband based PRS multiplexing, configuration information related to a usage of reserved communication resources for the signaling of the discovery signal in case an control region utilization or the like is used in the configuration of the signaling of the discovery signal, and possible grouping information for indicating a group of two or more secondary cells (RRHs) of which a respective discovery signal is received concurrently in a UE, for example.

In step S130, a transceiver network element such as RRH 30 of a secondary cell is set in accordance with the configuration done in step S110 in order to instruct when and where (i.e. on which resources) a discovery signal based on PRS is to be sent. Furthermore, relevant data related to the configuration of the signaling of the discovery signal (i.e. a configuration indication) is sent to a communication element like UE 10 which is located in a communication area such as the primary cell. The relevant data are, for example, the assistance information.

Figure 8:
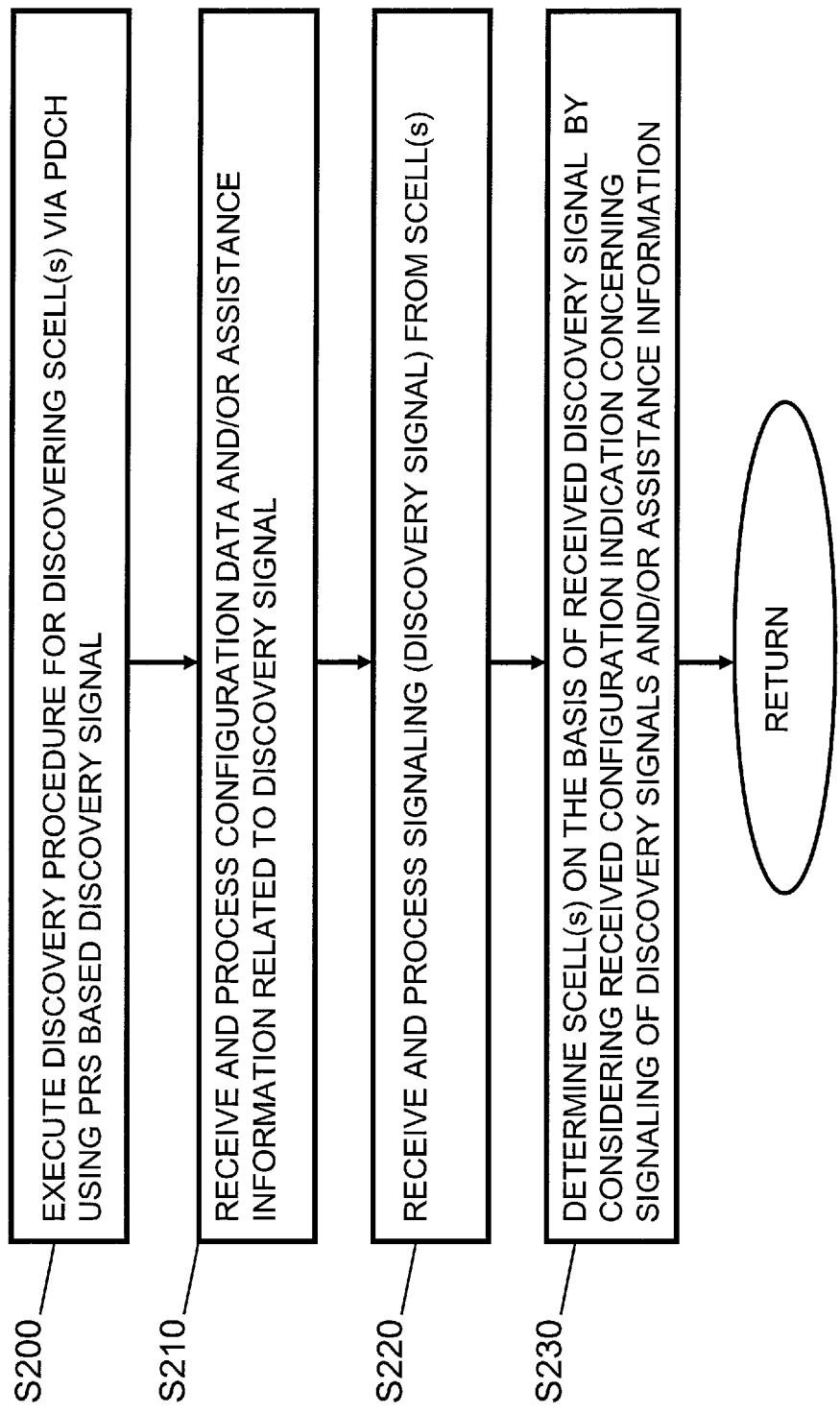
FIG. 8 shows a flowchart illustrating a discovery procedure conducted by a communication element according to an example of an embodiment of the invention.

FIG. 8 shows a flowchart illustrating a processing for conducting a discovery procedure of small cells in a communication network as shown e.g. in FIG. 1 according to some example embodiments of the invention. Specifically, FIG. 8 shows a processing for executing a corresponding discovery procedure on the terminal side. The method in FIG. 8 is executed, according to some example embodiments of the invention, in a communication element like the UE 10.

In step S200, execution of a discovery procedure for discovering at least one secondary cell (Scell) located in a communication area of a primary cell (Pcell) is initiated. According to some example embodiments of the invention, the discovery procedure is based on a discovery signal using PRS, as described above, wherein the discovery signal is communicated via a special channel, such as a PDCH.

The discovery procedure is further based on a configuration of the signaling of the discovery signal, wherein the configuration applies, as described in connection with step S110 of FIG. 7, at least one of the frequency domain multiplexing schemes (subband based PRS resource multiplexing, distributed PRS multiplexing with or without additional sequences) for splitting resources of the PRS in the frequency domain, and usage of reserved communication resources for the signaling of the discovery signal (e.g. resources of control region, as described above).

In step S210, data related to the configuration of the signaling of the discovery signal are received, e.g. from a communication network control element of the primary cell. The data or configuration indication comprises, according to some example embodiment of the invention, assistance information associated to the configuration of the signaling of the discovery signal is received, wherein according to some example embodiments of the invention the assistance information indicates at least one of a frequency domain starting point of a secondary cell being related to the frequency domain multiplexing, configuration information related to the usage of the reserved communication resources (control region) for the signaling of the discovery signal, and grouping information for indicating a group of two or more secondary cells of which a respective discovery signal is received concurrently.

In step S220, discovery signal(s) from one or more Scells (e.g. from a transceiver network element like an RRH thereof) is received via the PDCH. Based on this reception, in step S230, discovery procedure is executed so as to determine or discover Scells on the basis of the respective discovery signal based on PRS wherein the knowledge about the configuration of the signaling of the discovery signal is used for the determination of the Scell(s).

It is to be noted that, according to certain examples of embodiments of the invention, in case grouping information are included in the received assistance information, the processing in step S230 further comprises, according to some certain example embodiments of the invention, to detect first the group of the two or more secondary cells on the basis of a common discovery signal of the group, and to determine a preferred single secondary cell of the group e.g. on the basis of a link quality thereto. According to some example embodiments of the invention, in connection with the grouping information, the determination of the preferred single secondary cell of the group is based on information derived from the resource elements of the reserved communication resources which comprises additional sequences being associated to resources of the PRS.

Figure 9:
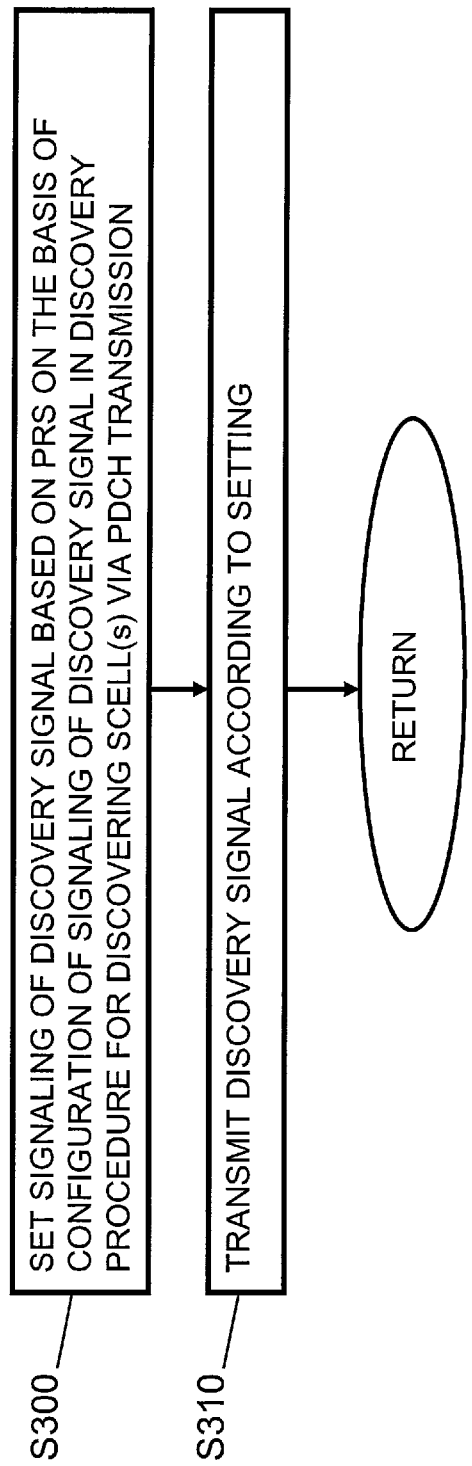
FIG. 9 shows a flowchart illustrating a discovery procedure conducted by a transceiver network element such as an RRH according to an example of an embodiment of the invention.

FIG. 9 shows a flowchart illustrating a processing for conducting a discovery procedure of small cells in a communication network as shown e.g. in FIG. 1 according to some example embodiments of the invention. Specifically, FIG. 9 shows a processing for executing a corresponding discovery procedure on the Scell side. The method in FIG. 9 is executed, according to some example embodiments of the invention, in a transceiver network element like the RRH 30.

In step S300, signaling of a discover signal in a discovery procedure for discovering the secondary cell (Scell) which is located in a communication area of a primary cell (Pcell) is prepared by a corresponding setting. According to some example embodiments of the invention, the discovery procedure is based on a discovery signal using PRS, as described above, wherein the discovery signal is communicated via a special channel, such as a PDCH.

The setting of the signaling of the discovery signal in the above described discovery procedure is based on a configuration which applies, as described in connection with step S110 of FIG. 7, at least one of the frequency domain multiplexing schemes (subband based PRS resource multiplexing, distributed PRS multiplexing with or without additional sequences) for splitting resources of the PRS in the frequency domain, and usage of reserved communication resources for the signaling of the discovery signal (e.g. resources of control region, as described above). According to some example embodiments of the invention, even a corresponding step is not shown in FIG. 9, data related to the configuration of the signaling of the discovery signal are received from a communication network control element of the primary cell.

In step S310, the discovery signal is sent from the transceiver network element like the RRH 30, for example via the PDCH, wherein the signaling is based on the setting in step S300.

Figure 10:
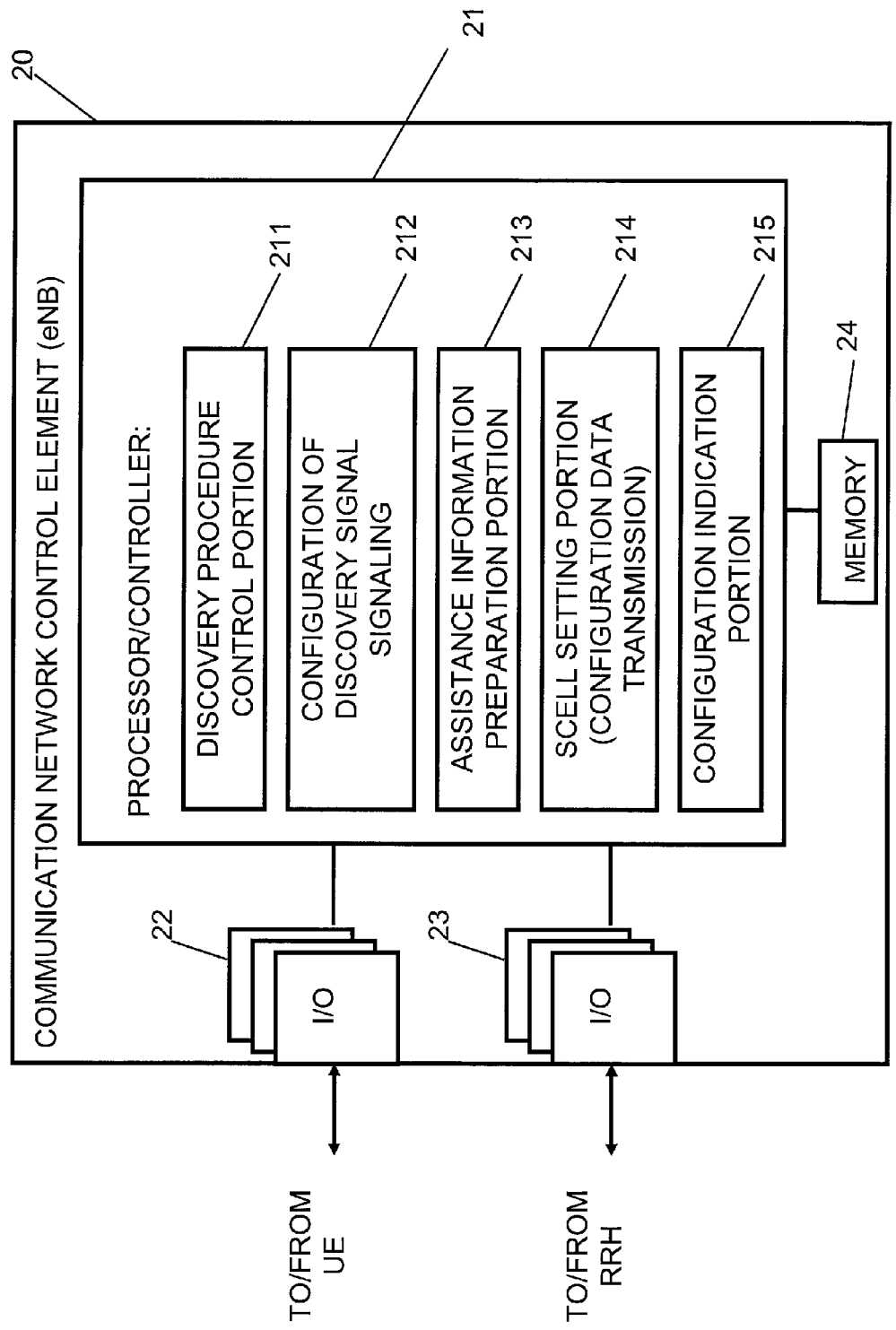
FIG. 10 shows a block circuit diagram of a communication network control element including processing portions conducting functions according to an example of an embodiment of the invention.

In FIG. 10, a block circuit diagram illustrating a circuitry indicating a configuration of a communication network control element, such as the eNB 20, is shown which is configured to implement the processing for conducting the discovery procedure of small cells as described in connection with the some example embodiments of the invention. That is, a circuitry is shown which comprises at least one processor and at least one memory including computer program code the at least one memory and the computer program code being configured to, with the at least one processor, cause the eNB 20 to perform functions described below, for example by executing a corresponding algorithm. It is to be noted that the communication network control element or eNB 20 shown in FIG. 10 may comprise several further elements or functions besides those described herein below, which are omitted for the sake of simplicity as they are not essential for understanding the invention. Furthermore, even though reference is made to an eNB, the communication network control element may be also another device having a similar function, such as a modem chipset, a chip, a module etc., which can also be part of a base station or eNB or attached as a separate element to a base station or eNB, or the like.

The communication network control element or eNB 20 may comprise a processing function or processor 21, such as a CPU or the like, which executes instructions given by programs or the like related to the control signal transmission control. The processor 21 may comprise one or more processing portions dedicated to specific processing as described below, or the processing may be run in a single processor. Portions for executing such specific processing may be also provided as discrete elements or within one or more further processors or processing portions, such as in one physical processor like a CPU or in several physical entities, for example. Reference signs 22 and 23 denote transceiver or input/output (I/O) units connected to the processor 21. The I/O units 22 may be used for communicating with a communication element like UE 10 and the I/O units 23 may be used for communicating with a transceiver network element like one or more of the RRHs 30. The I/O units 22 and 23 may be a combined unit comprising communication equipment towards several network elements, or may comprise a distributed structure with a plurality of different interfaces for different network elements. Reference sign 24 denotes a memory usable, for example, for storing data and programs to be executed by the processor 21 and/or as a working storage of the processor 21.

The processor 21 is configured to execute processing related to the above described discovery procedure of small cells. In particular, the processor 21 comprises a sub-portion 211 as a processing portion which is usable for controlling the discovery procedure. The portion 211 may be configured to perform a processing according to step S100 of FIG. 7, for example. Furthermore, the processor 21 comprises a sub-portion 212 usable as a portion for conducting a configuration of a signaling of a discovery signal. The portion 212 may be configured to perform processing according to step S110 of FIG. 7, for example. In addition, the processor 21 comprises a sub-portion 213 usable as a processing portion for preparing assistance information related to the discovery procedure. The portion 213 may be configured to perform processing according to step S120 of FIG. 7, for example. Moreover, the processor 21 comprises a sub-portion 214 usable as a processing portion for setting one or more Scells (RRHs) in accordance with the configuration. The portions 214 and 215 may be configured to perform processing according to step S130 of FIG. 7, for example.

Figure 11:
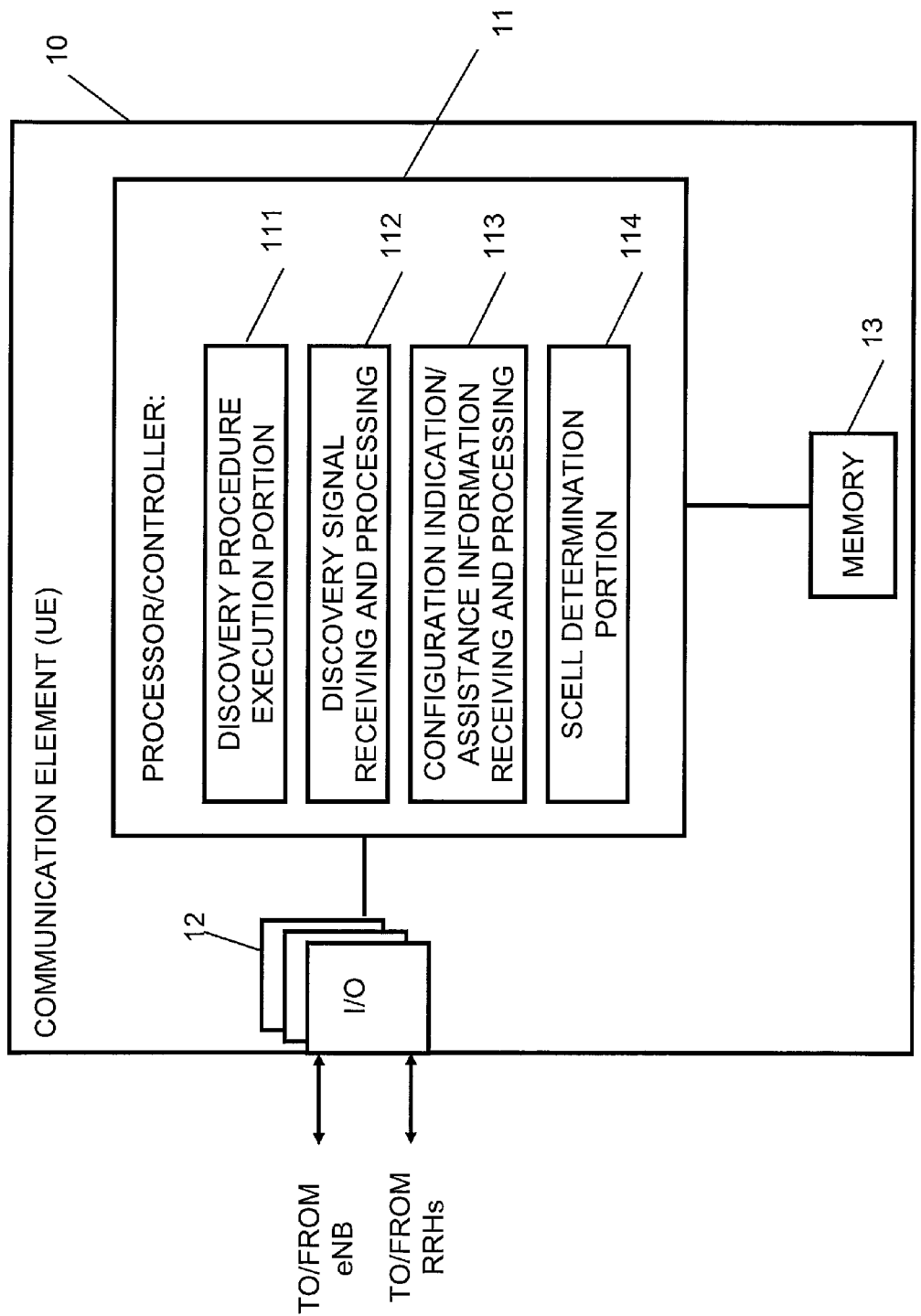
FIG. 11 shows a block circuit diagram of a communication element including processing portions conducting functions according to an example of an embodiment of the invention.

In FIG. 11, a block circuit diagram illustrating a circuitry indicating a configuration of a communication element, such as the UE 10, is shown which is configured to implement the discovery procedure of small cells as described in connection with the examples of some embodiment the invention. That is, a circuitry is shown which comprises at least one processor and at least one memory including computer program code the at least one memory and the computer program code being configured to, with the at least one processor, cause the UE 10 to perform functions described below, for example by executing a corresponding algorithm. It is to be noted that the communication element or UE 10 shown in FIG. 11 may comprise several further elements or functions besides those described herein below, which are omitted for the sake of simplicity as they are not essential for understanding the invention. Furthermore, even though reference is made to an UE, the communication element may be also another terminal device having a similar function, such as a modem chipset, a chip, a module etc., which can also be part of an UE or attached as a separate element to a UE, or the like.

The communication element or UE 10 may comprise a processing function or processor 11, such as a CPU or the like, which executes instructions given by programs or the like related to the discovery procedure. The processor 11 may comprise one or more processing portions dedicated to specific processing as described below, or the processing may be run in a single processor. Portions for executing such specific processing may be also provided as discrete elements or within one or more further processors or processing portions, such as in one physical processor like a CPU or in several physical entities, for example. Reference sign 12 denotes transceiver or input/output (I/O) units connected to the processor 11. The I/O unit 12 may be used for communicating with a communication network control element like eNB 20 and for communicating with a transceiver network element like one or more of the RRHs 30. The I/O unit 12 may be a combined unit comprising communication equipment towards several network elements, or may comprise a distributed structure with a plurality of different interfaces for different network elements. Reference sign 13 denotes a memory usable, for example, for storing data and programs to be executed by the processor 11 and/or as a working storage of the processor 11.

The processor 11 is configured to execute processing related to the above described discovery procedure of small cells. In particular, the processor 11 comprises a sub-portion 111 usable as a processing portion for executing the discovery procedure. The portion 111 may be configured to perform a processing according to step S200 of FIG. 8, for example. Furthermore, the processor 11 comprises a sub-portion 112 usable as a portion for receiving and processing a discovery signal from a small cell. The portion 112 may be configured to perform a processing according to step S220 of FIG. 8, for example. In addition, the processor 11 comprises a sub-portion 113 usable as a processing portion for receiving and processing a configuration indication and/or assistance information. The portion 113 may be configured to perform a processing according to step S210 of FIG. 8, for example. Moreover, the processor 11 comprises a sub-portion 114 usable as a processing portion for determining a small cell on the basis of the discovery signal processing. The portion 114 may be configured to perform processing according to step S230 of FIG. 8, for example.

Figure 12:
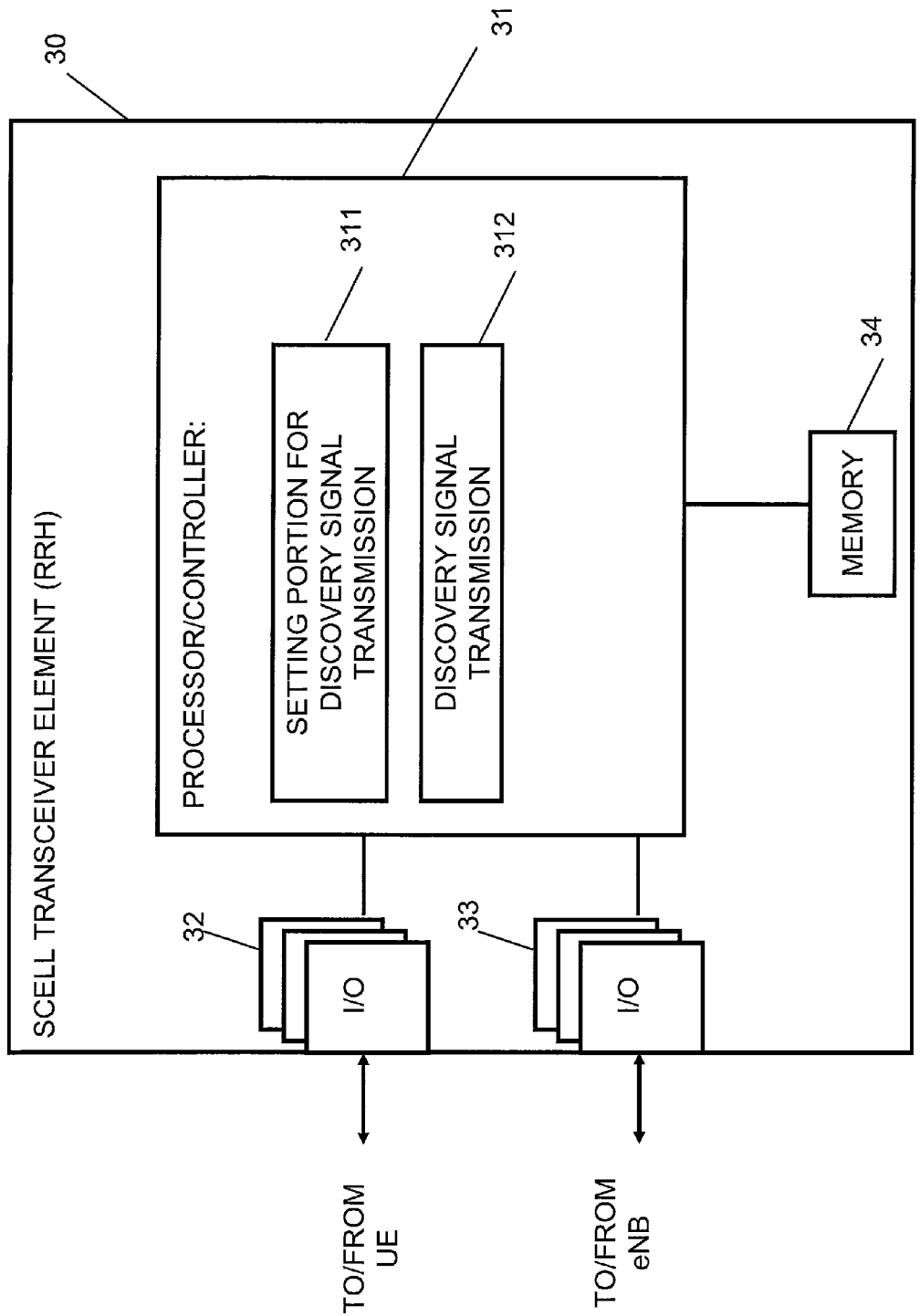
FIG. 12 shows a block circuit diagram of a transceiver network element such as an RRH including processing portions conducting functions according to an example of an embodiment of the invention.

In FIG. 12, a block circuit diagram illustrating a circuitry indicating a configuration of a transceiver network element, such as the RRH 30, is shown which is configured to implement the discovery procedure of small cells as described in connection with the examples of embodiments of the invention. That is, a circuitry is shown which comprises at least one processor and at least one memory including computer program code the at least one memory and the computer program code being configured to, with the at least one processor, cause the RRH 30 to perform functions described below, for example by executing a corresponding algorithm. It is to be noted that the transceiver network element or RRH 30 shown in FIG. 12 may comprise several further elements or functions besides those described herein below, which are omitted for the sake of simplicity as they are not essential for understanding the invention. Furthermore, even though reference is made to an RRH, the transceiver network element may be also another device having a similar function, such as a modem chipset, a chip, a module etc., which can also be part of an RRH or attached as a separate element to an RRH, or the like.

The transceiver network element or RRH 30 may comprise a processing function or processor 31, such as a CPU or the like, which executes instructions given by programs or the like related to the discovery procedure. The processor 31 may comprise one or more processing portions dedicated to specific processing as described below, or the processing may be run in a single processor. Portions for executing such specific processing may be also provided as discrete elements or within one or more further processors or processing portions, such as in one physical processor like a CPU or in several physical entities, for example. Reference signs 32 and 33 denote transceiver or input/output (I/O) units connected to the processor 31. The I/O unit 32 may be used for communicating with a communication element like UE 10, and the I/O unit 33 may be used for communicating with a communication network control element like eNB 20. The I/O units 32 and 33 may be a combined unit comprising communication equipment towards several network elements, or may comprise a distributed structure with a plurality of different interfaces for different network elements. Reference sign 34 denotes a memory usable, for example, for storing data and programs to be executed by the processor 31 and/or as a working storage of the processor 31.

The processor 31 is configured to execute processing related to the above described discovery procedure of small cells. In particular, the processor 31 comprises a sub-portion 311 as a processing portion which is usable for setting a discovery signal transmission based on a configuration. The portion 311 may be configured to perform a processing according to step S300 of FIG. 9, for example. Furthermore, the processor 31 comprises a sub-portion 312 usable as a portion for transmitting the discovery signal by using resources being set. The portion 312 may be configured to perform a processing according to step S310 of FIG. 9, for example.

According to another example of an embodiment of the invention, there is provided, for example, an apparatus comprising discovery procedure control means for controlling a discovery procedure for discovering at least one secondary cell located in a communication area of a primary cell, the discovery procedure using a discovery signal communicated via a physical discovery channel, and discovery signaling configuration means for configuring a signaling of the discovery signal, wherein the discovery signal is based on a positioning reference signal, and for applying in the configuration of the signaling of the discovery signal at least one of frequency domain multiplexing for splitting resources of the positioning reference signal in the frequency domain, and using reserved communication resources for the signaling of the discovery signal, the reserved communication resources being otherwise reserved for specific control channels.

According to another example of an embodiment of the invention, there is provided, for example, an apparatus comprising discovery procedure executing means for executing a discovery procedure for discovering at least one secondary cell located in a communication area of a primary cell, the discovery procedure using a discovery signal based on a positioning reference signal and communicated via a physical discovery channel, wherein the discovery procedure is based on a configuration of the signaling of the discovery signal, the configuration applying at least one of frequency domain multiplexing for splitting resources of the positioning reference signal in the frequency domain, and using reserved communication resources for the signaling of the discovery signal, the reserved communication resources being otherwise reserved for specific control channels.

According to another example of an embodiment of the invention, there is provided, for example, an apparatus comprising discovery signal transmitting means for causing transmitting of a discovery signal usable for discovering a secondary cell located in a communication area of a primary cell, wherein the discovery signal is based on a positioning reference signal and communicated via a physical discovery channel, and discovery signaling setting means for setting a signaling of the discovery signal on the basis of a configuration of the signaling of the discovery signal, the configuration applying at least one of frequency domain multiplexing for splitting resources of the positioning reference signal in the frequency domain, and using reserved communication resources for the signaling of the discovery signal, the reserved communication resources being otherwise reserved for specific control channels.

For the purpose of the some embodiments of the present invention as described herein above, it should be noted that

- an access technology via which signaling is transferred to and from a network element may be any technology by means of which a network element or sensor node can access another network element or node (e.g. via a base station or generally an access node). Any present or future technology, such as WLAN (Wireless Local Access Network), WiMAX (Worldwide Interoperability for Microwave Access), LIE, LTE-A, Bluetooth, Infrared, and the like may be used; although the above technologies are mostly wireless access technologies, e.g. in different radio spectra, access technology in the sense of the present invention implies also wired technologies, e.g. IP based access technologies like cable networks or fixed lines but also circuit switched access technologies; access technologies may be distinguishable in at least two categories or access domains such as packet switched and circuit switched, but the existence of more than two access domains does not impede the invention being applied thereto,
- usable communication networks and transmission nodes may be or comprise any device, apparatus, unit or means by which a station, entity or other user equipment may connect to and/or utilize services offered by the access network; such services include, among others, data and/or (audio-) visual communication, data download etc.;
- a user equipment or communication network element may be any device, apparatus, unit or means which is usable as a user communication device and by which a system user or subscriber may experience services from an access network, such as a mobile phone, a wireless mobile terminal, a personal digital assistant PDA, a smart phone, a personal computer (PC), a laptop computer, a desktop computer or a device having a corresponding functionality, such as a modem chipset, a chip, a module etc., which can also be part of a UE or attached as a separate element to a UE, or the like, wherein corresponding devices or terminals may be, for example, an LTE, an LTE-A, a TETRA (Terrestrial Trunked Radio), an UMTS, a GSM/EDGE etc. smart mobile terminal or the like;
- method steps likely to be implemented as software code portions and being run using a processor at a network element or terminal (as examples of devices, apparatuses and/or modules thereof, or as examples of entities including apparatuses and/or modules for it), are software code independent and can be specified using any known or future developed programming language as long as the functionality defined by the method steps is preserved;
- generally, any method step is suitable to be implemented as software or by hardware without changing the idea of the invention in terms of the functionality implemented;
- method steps and/or devices, apparatuses, units or means likely to be implemented as hardware components at a terminal or network element, or any module(s) thereof, are hardware independent and can be implemented using any known or future developed hardware technology or any hybrids of these, such as a microprocessor or CPU (Central Processing Unit), MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components; in addition, any method steps and/or devices, units or means likely to be implemented as software components may for example be based on any security architecture capable e.g. of authentication, authorization, keying and/or traffic protection;
- devices, apparatuses, units or means can be implemented as individual devices, apparatuses, units or means, but this does not exclude that they are implemented in a distributed fashion throughout the system, as long as the functionality of the device, apparatus, unit or means is preserved; for example, for executing operations and functions according to examples of embodiments of the invention, one or more processors may be used or shared in the processing, or one or more processing sections or processing portions may be used and shared in the processing, wherein one physical processor or more than one physical processor may be used for implementing one or more processing portions dedicated to specific processing as described,
- an apparatus may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;
- a device may be regarded as an apparatus or as an assembly of more than one apparatus, whether functionally in cooperation with each other or functionally independently of each other but in a same device housing, for example.

Furthermore, as used in this application, the terms, device' or, circuitry' refer to all of the following: (a) hardware-only circuit implementations (such as implementations in only analog and/or digital circuitry) and (b) combinations of circuits and software (and/or firmware), such as (as applicable): (i) a combination of processor(s) or (ii) portions of processor(s)/software (including digital signal processor(s)), software, and memory (or memories) working together to cause an apparatus, such as a mobile phone or server, to perform various functions) and (c) circuits, such as a microprocessor (or plural microprocessors) or a portion of a microprocessor (or plural microprocessors), that requires/ require software or firmware for operation, even if the software or firmware is not physically present. This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

As described above, there is proposed a mechanism for controlling and conducting a discovery procedure of small cells or secondary cells located in a macro cell or primary cell. The discovery procedure is based on a discovery signal communicated via PDCH and based on a positioning reference signal (PRS). For configuring the signaling of the discovery signal, frequency domain multiplexing for splitting resources of the PRS in the frequency domain for increasing capacity, and/or usage of reserved communication resources for the signaling of the discovery signal are employed. Assistance information is provided to the UE for supporting the discovery of small cells.

Although the present invention has been described herein before with reference to particular embodiments thereof, the present invention is not limited thereto and various modifications can be made thereto.

What is claimed is:

1. A method comprising:
    controlling a discovery procedure for discovering a plurality of secondary cells located in a communication area of a primary cell, the discovery procedure using a discovery signal communicated via a physical discovery channel;
    configuring a signaling of the discovery signal, wherein the discovery signal is based on a positioning reference signal;
    preparing assistance information, associated with the configuration of the signaling of the discovery signal, indicating grouping information for indicating a group of two or more secondary cells of the plurality of secondary cells from which a respective discovery signal is received concurrently by a user equipment (UE);
    applying, when configuring the signaling of the discovery signal,
        frequency domain multiplexing for splitting resources of the positioning reference signal in a frequency domain by allocating serials of blocks of consecutive resource blocks forming a respective orthogonal resource to each of a plurality of positioning reference channels, each channel of the plurality of positioning reference channels is configured to be used by a secondary cell of the plurality of secondary cells;
    detecting the group of the two or more secondary cells on the basis of a common discovery signal of the group; and
    determining a preferred single secondary cell of the group based on information derived from resource elements of reserved communication resources comprising sequences associated with resources of the positioning reference signal.

2. The method according to claim 1, wherein
    the frequency domain multiplexing further comprises distributed multiplexing of resources of the positioning reference signal, wherein a part of resources in resource blocks originally allocated to the positioning reference signal is released.

3. The method according to claim 1, further comprising using the reserved communication resources for the signaling of the discovery signal, the reserved communication resources being otherwise reserved for specific control channels, by at least one of:
    using resource elements of the reserved communication resources for the discovery signal based on the positioning reference signal, wherein a pattern of arrangement of the positioning reference signal is kept unchanged, and
    using resource elements of the reserved communication resources for the sequences associated with the resources of the positioning reference signal.

4. The method according to claim 3, wherein
    the sequences are orthogonal or semi-orthogonal in time, frequency or code domain,
    the sequences are separated from the positioning reference signal, and
    the sequences are associated to one or multiple orthogonal resources related to the positioning reference signal and provide information related to an identity of a secondary cell.

5. The method according to claim 1, further comprising
    setting a transceiver element of a secondary cell to send the discovery signal in accordance with the configuration of the signaling of the discovery signal, and
    sending data related to the configuration of the signaling of the discovery signal to a communication element located in the primary cell.

6. The method according to claim 5, wherein the method is implemented by a communication network control element comprising at least one of a base station of a cellular network, an evolved node B of a Long Term Evolution or Long Term Evolution Advanced communication network, an access node, and a remote radio head, which controls the primary cell, wherein the communication element comprises at least one of a terminal device or user equipment located and communicating in the primary cell, and the transceiver element of the secondary cell comprises a remote radio head connected to the communication network control element.

7. An apparatus comprising
    at least one processor; and
    at least one memory including computer program code;
    wherein the at least one memory and the computer program code are configured, with the at least one processor, to cause the apparatus at least to perform
        a discovery procedure control function configured to control a discovery procedure for discovering a plurality of secondary cells located in a communication area of a primary cell, the discovery procedure using a discovery signal communicated via a physical discovery channel, and
        a discovery signaling configuration function arranged to configure a signaling of the discovery signal, wherein the discovery signal is based on a positioning reference signal, and to apply in the configuration of the signaling of the discovery signal using reserved communication resources for the signaling of the discovery signal, the reserved communication resources being otherwise reserved for specific control channels;
        an assistance information preparation function arranged to prepare assistance information associated with the configuration of the signaling of the discovery signal, the assistance information indicating grouping information for indicating a group of two or more secondary cells from which a respective discovery signal is received concurrently by a user equipment (UE); and wherein the discovery procedure control function is further configured to determine a preferred single secondary cell, of the group of two or more secondary cells detected on the basis of a common discovery signal of the group, based on information derived from resource elements of the reserved communication resources comprising sequences associated with resources of the positioning reference signal.

8. The apparatus according to claim 7, wherein the discovery signaling configuration function is further arranged to apply frequency domain multiplexing for splitting resources of the positioning reference signal in a frequency domain, the frequency domain multiplexing comprising at least one of multiplexing of resources of the positioning reference signal on the basis of subbands of an allocated bandwidth, wherein a plurality of orthogonal resources each comprise a serial of consecutive resource blocks, each orthogonal resource allocated to a secondary cell of the group of two or more secondary cells; and distributed multiplexing of resources of the positioning reference signal, wherein a part of resources in resource blocks originally allocated to the positioning reference signal is released.

9. The apparatus according to claim 7, wherein the discovery signaling configuration function is further arranged, when using the reserved communication resources for the signaling of the discovery signal, to use resource elements of the reserved communication resources for the discovery signal based on the positioning reference signal, wherein a pattern of arrangement of the positioning reference signal is kept unchanged, and to use resource elements of the reserved communication resources for the sequences associated with resources of the positioning reference signal.

10. The apparatus according to claim 9, wherein the sequences are orthogonal or semi-orthogonal in time, frequency or code domain, the sequences are separated from the positioning reference signal, and the sequences are associated to one or multiple orthogonal resources related to the positioning reference signal and provide information related to an identity of a secondary cell.

11. The apparatus according to claim 7, wherein the assistance information preparation function is further arranged to prepare assistance information indicating at least one of a frequency domain starting point of a secondary cell being related to frequency domain multiplexing, and configuration information related to a usage of the reserved communication resources for the signaling of the discovery signal.

12. The apparatus according to claim 7, wherein the at least one memory and the computer program code are configured, with the at least one processor, to cause the apparatus at least to perform a setting function arranged to set a transceiver element of a secondary cell to send a discovery signal in accordance with the configuration of the signaling of the discovery signal, and a configuration indication function arranged to cause sending of data related to the configuration of the signaling of the discovery signal to a communication element located in the primary cell.

13. The apparatus according to claim 12, wherein the apparatus comprises at least one of a base station of a cellular network, an evolved node B of a Long Term Evolution or Long Term Evolution Advanced communication network, an access node, and a remote radio head, which controls the primary cell, wherein the communication element comprises at least one of a terminal device or user equipment located and communicating in the primary cell, and the transceiver element of the secondary cell comprising a remote radio head connected to the communication network control element.

14. A method comprising executing a discovery procedure for discovering a plurality of secondary cells located in a communication area of a primary cell, the discovery procedure using a discovery signal based on a positioning reference signal and communicated via a physical discovery channel, wherein the discovery procedure is based on a configuration of a signaling of the discovery signal, the configuration applying at least one of frequency domain multiplexing for splitting resources of the positioning reference signal into a plurality of channels in a frequency domain, each channel of the plurality of channels corresponding to a secondary cell of the plurality of secondary cells, and using reserved communication resources for the signaling of the discovery signal, the reserved communication resources being otherwise reserved for specific control channels;

receiving and processing assistance information associated with the configuration of the signaling of the discovery signal, the assistance information indicating grouping information for indicating a group of two or more secondary cells of the plurality of secondary cells from which a discovery signal is received concurrently by a user equipment (UE); and when executing the discovery procedure under consideration of the grouping information, detecting the group of two or more secondary cells on the basis of a common discovery signal of the group, and determining a preferred single secondary cell of the group of two or more secondary cells, based on information derived from resource elements of the reserved communication resources comprising sequences associated with resources of the positioning reference signal.

15. The method according to claim 14, wherein the frequency domain multiplexing comprises at least one of multiplexing of resources of the positioning reference signal on the basis of subbands of an allocated bandwidth, wherein resource blocks are divided into serials of blocks of consecutive resource blocks forming a respective orthogonal resource, and distributed multiplexing of resources of the positioning reference signal, wherein a part of resources in resource blocks originally allocated to the positioning reference signal is released.

16. The method according to claim 14, wherein the using of reserved communication resources for the signaling of the discovery signal comprises at least one of using resource elements of the reserved communication resources for the discovery signal based on the positioning reference signal, wherein a pattern of arrangement of the positioning reference signal is kept unchanged, and using resource elements of the reserved communication resources for the sequences associated with resources of the positioning reference signal.

17. The method according to claim 16, wherein the sequences are orthogonal or semi-orthogonal in time, frequency or code domain, the sequences are separated from the positioning reference signal, and the sequences are associated to one or multiple orthogonal resources related to the positioning reference signal and provide information related to an identity of a secondary cell.

18. The method according to claim 14, wherein the assistance information further indicates:
- a frequency domain starting point of a secondary cell being related to the frequency domain multiplexing, or
- configuration information related to a usage of the reserved communication resources for the signaling of the discovery signal.

19. A method, comprising:

discovering a plurality of secondary cells located in a communication area of a primary cell, detecting a group of two or more secondary cells of the plurality of secondary cells on the basis of a common discovery signal of the group, the common discovery signal based on a positioning reference signal multiplexed into a plurality of channels in a frequency domain, each channel of the plurality of channels corresponding to a secondary cell of the plurality of secondary cells, the group identified according to received assistance information which indicates that the common discovery signal is received concurrently by a user equipment (UE) from each secondary cell of the group, and determining a preferred single secondary cell of the group based on information derived from resource elements of reserved communication resources comprising sequences associated with resources of the positioning reference signal.

* * * * *